United States Patent [19]

Drexler et al.

[11] Patent Number: 4,910,725

[45] Date of Patent: Mar. 20, 1990

[54] OPTICAL RECORDING METHOD FOR DATA CARDS

[75] Inventors: Jerome Drexler; Joseph B. Arnold, both of Los Altos Hills, Calif.

[73] Assignee: Drexler Technology Corporation, Mountain View, Calif.

[21] Appl. No.: 920,809

[22] Filed: Oct. 17, 1986

Related U.S. Application Data

[63] Continuation-in-part of Ser. No. 855,228, Apr. 23, 1986.

[51] Int. Cl.⁴ .................. G11B 7/007; G06K 1/12
[52] U.S. Cl. .................. 369/275; 369/59; 369/47; 235/494; 235/487; 235/454
[58] Field of Search .................. 369/275, 53, 54, 58, 369/47, 48, 50, 44, 46, 59; 365/234; 235/454, 456, 480, 487, 488, 494; 346/76 L

[56] References Cited

U.S. PATENT DOCUMENTS

| | | | |
|---|---|---|---|
| 3,654,624 | 4/1972 | Becker et al. | 356/234 |
| 4,142,209 | 2/1979 | Hedlund | 365/234 |
| 4,229,808 | 10/1980 | Hui | 365/234 |
| 4,308,557 | 12/1981 | Dieterich | 369/47 |
| 4,488,278 | 12/1984 | Dieterich | 369/50 |
| 4,534,031 | 8/1985 | Jewer | 369/59 |
| 4,542,288 | 9/1985 | Drexler | 235/488 |
| 4,544,835 | 10/1985 | Drexler | 235/487 |
| 4,571,716 | 2/1986 | Szerlip | 369/54 |
| 4,598,196 | 7/1986 | Pierce et al. | 235/454 |
| 4,634,850 | 1/1987 | Pierce et al. | 235/487 |
| 4,652,730 | 3/1987 | Marshall | 369/47 |
| 4,692,603 | 9/1987 | Brass et al. | 235/454 |
| 4,730,293 | 3/1988 | Pierce et al. | 235/454 |

Primary Examiner—Alan Faber
Assistant Examiner—Robert A. Weinhardt
Attorney, Agent, or Firm—Thomas Schneck

[57] ABSTRACT

A method of recording data on a card in which track indicia are laser recorded by a user on at least one end of a card prerecorded with tracks only. Track indicia include start and stop marks defining usable recordable areas, synchronization marks, error codes and track numbers and track termination codes. Start and stop marks may be series of lines recorded in a pattern across the tracks and in addition to demarcating usable recordable areas of the card may indicate the location of track numbers and data areas as well as the particular encoding scheme used on the card. Data blocks may be written on entire tracks or in sectors. When recording errors are detected, the data block is rewritten in a new sector or on another track using the same track number.

11 Claims, 4 Drawing Sheets

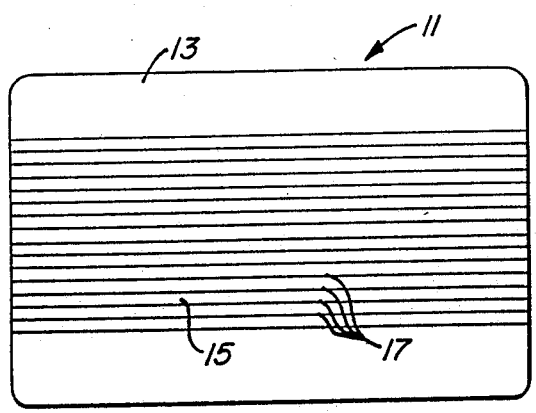
FIG._1.
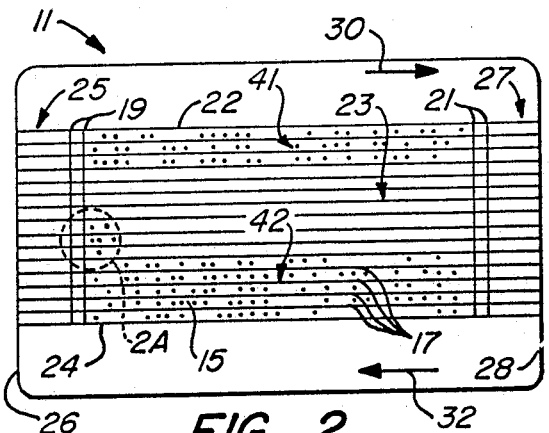
FIG._2.
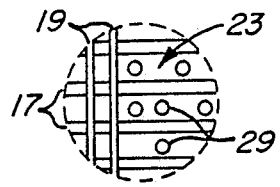
FIG._2A.
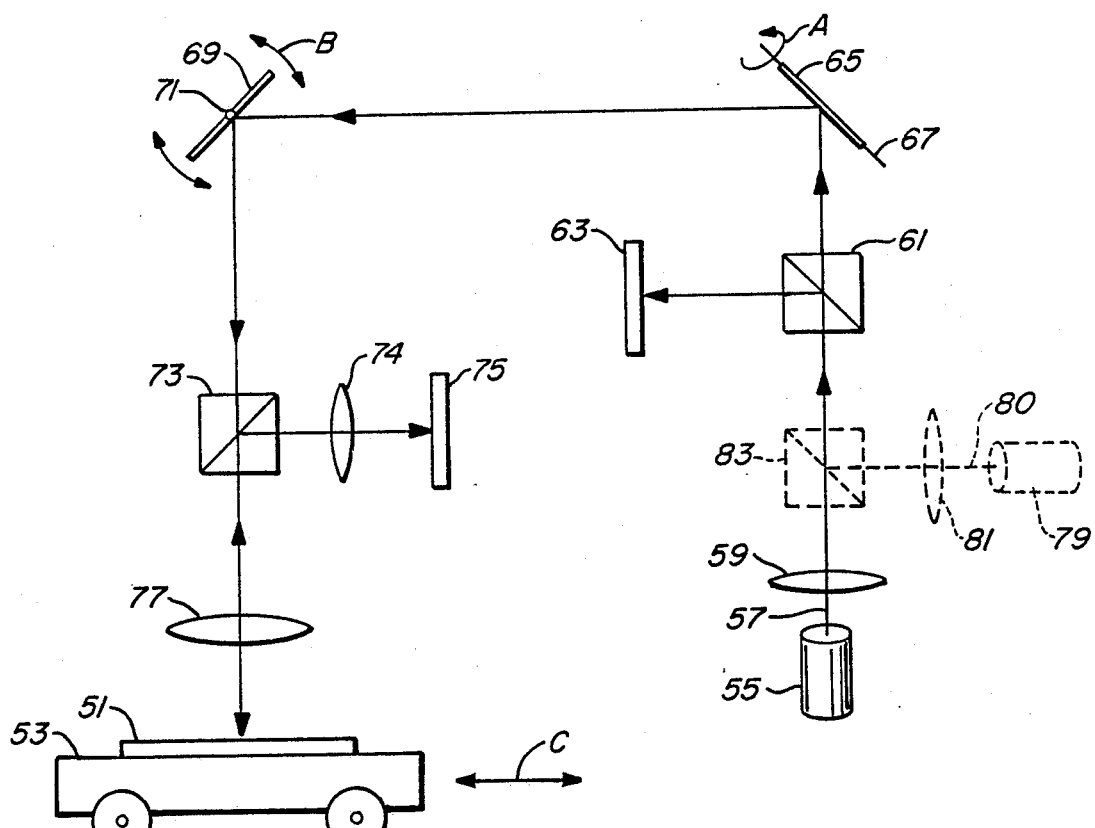
FIG._7.

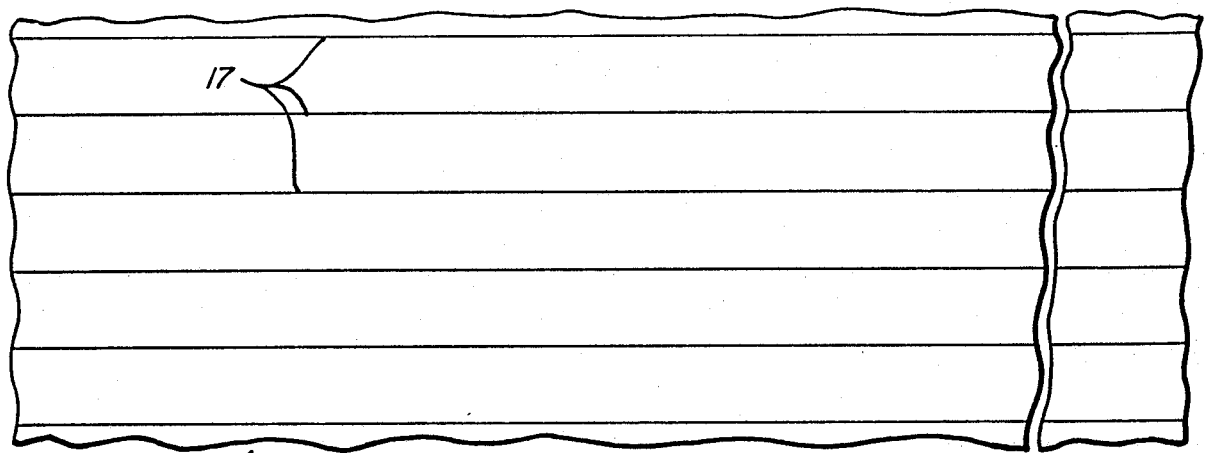
FIG._3A.
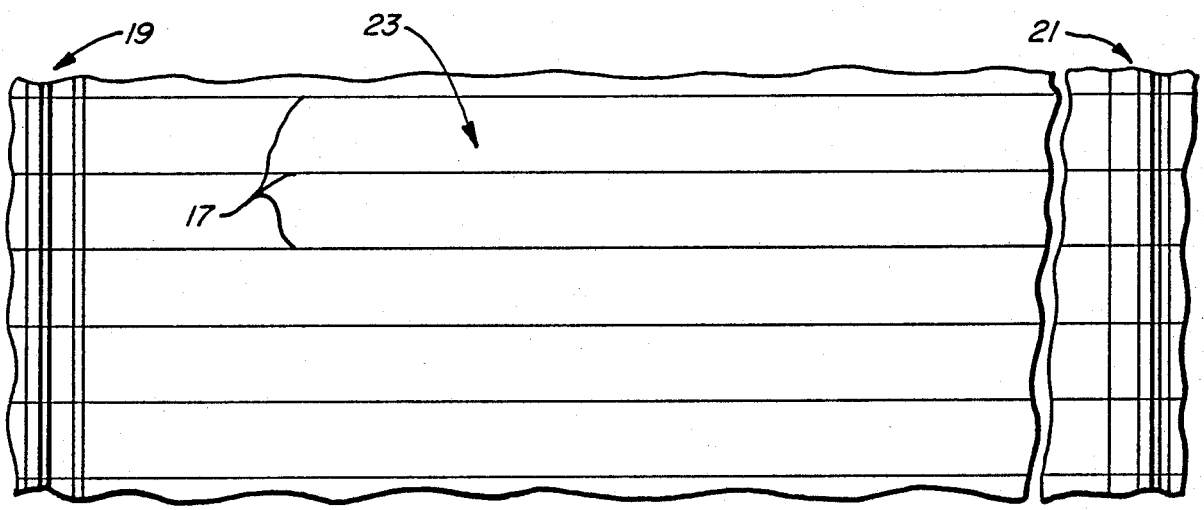
FIG._3B.
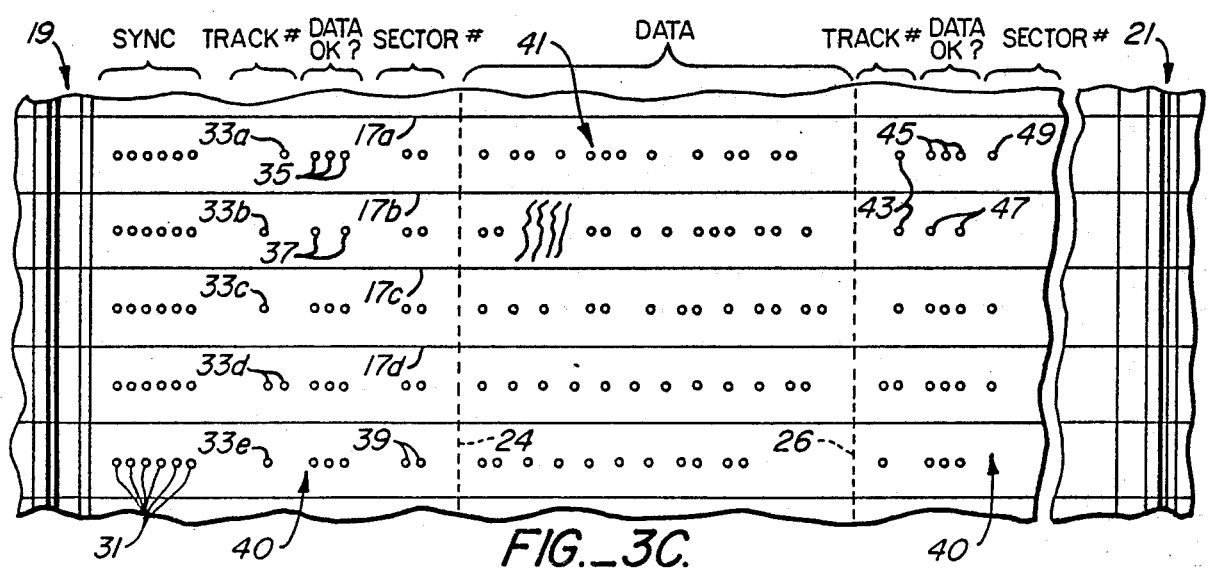
FIG._3C.

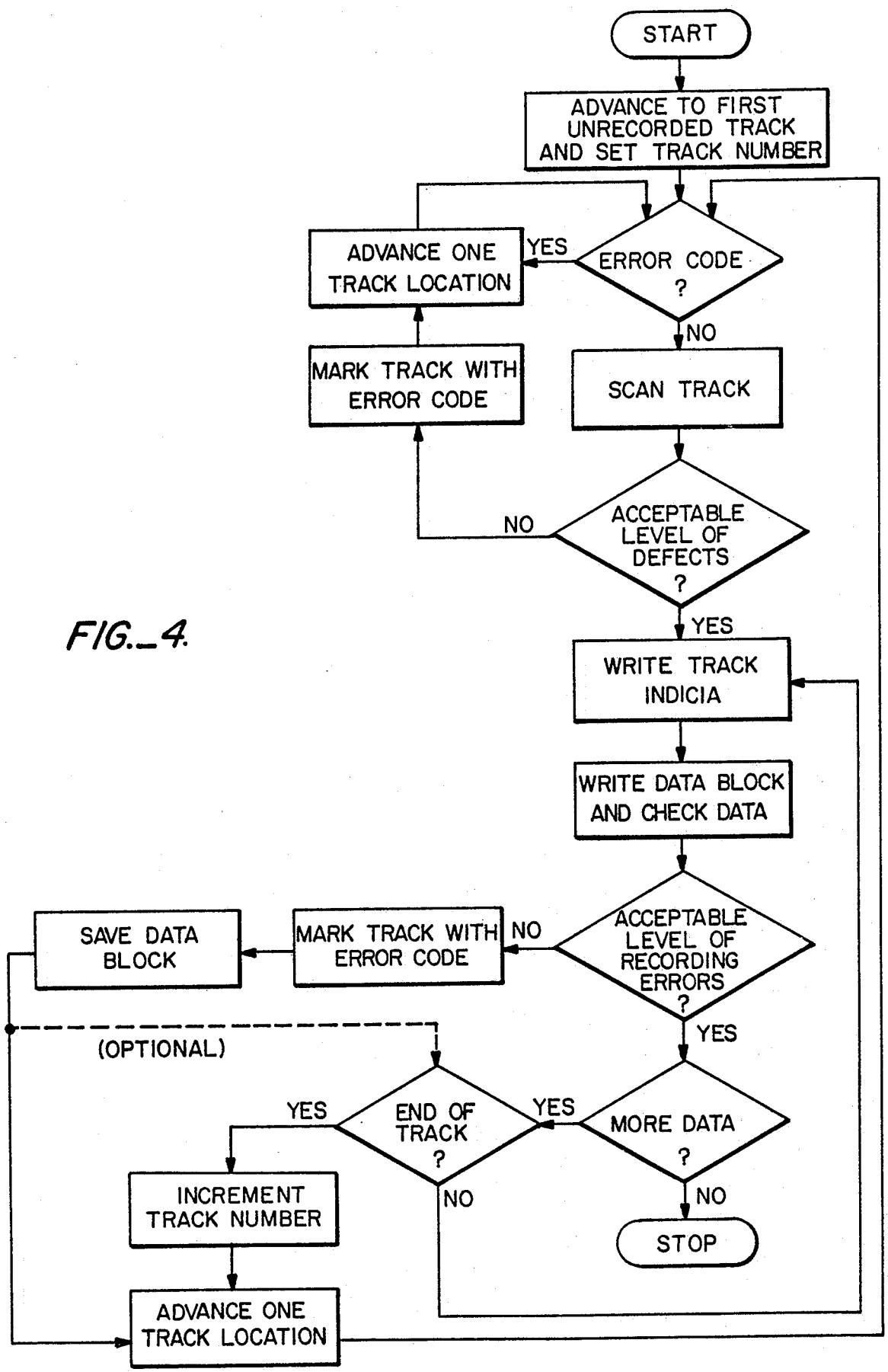
FIG._4.

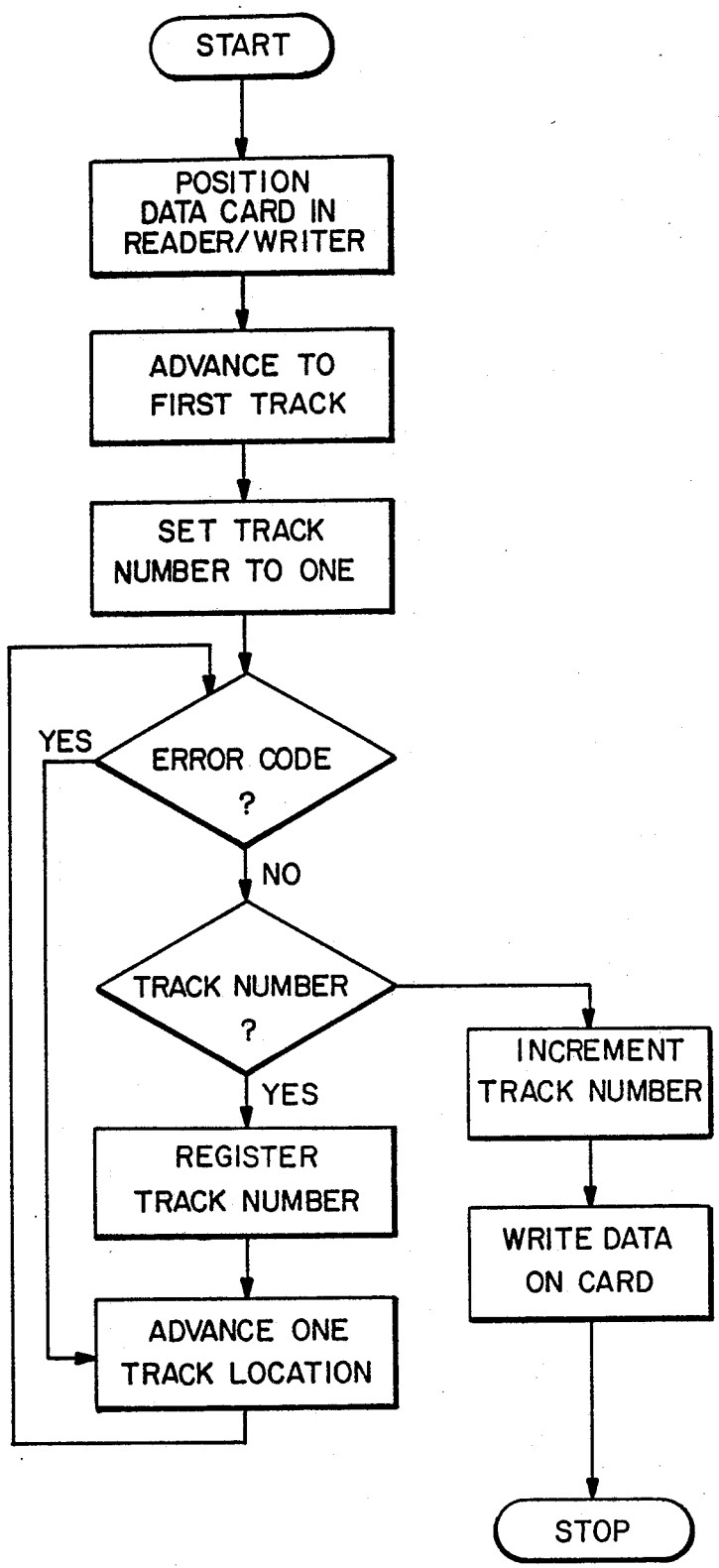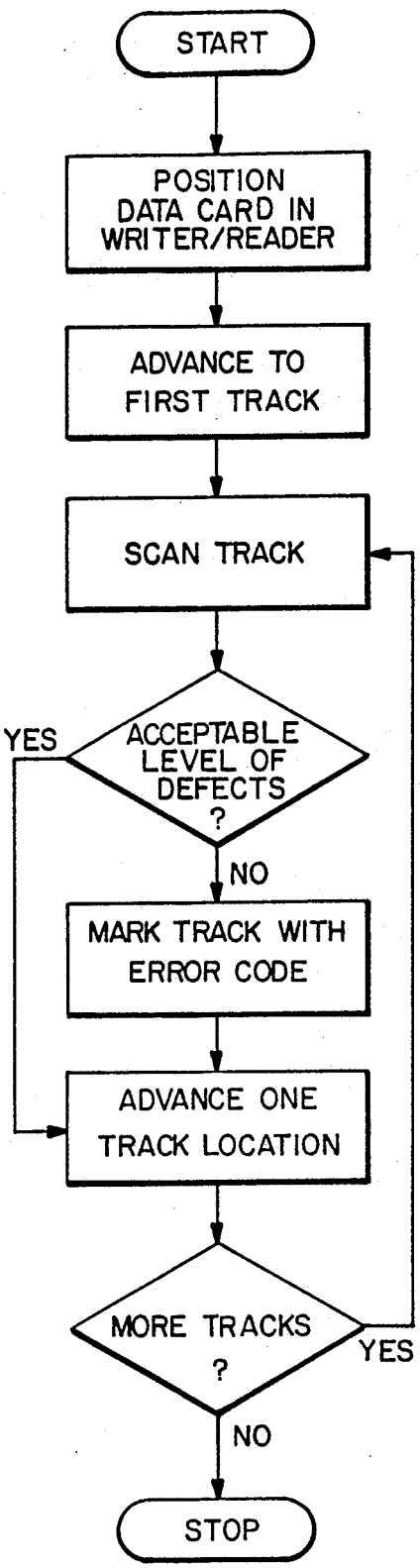
FIG._5.   FIG._6.

OPTICAL RECORDING METHOD FOR DATA CARDS

This application is a continuation-in-part of application Ser. No. 855,228, filed Apr. 23, 1986.

TECHNICAL FIELD

The present invention relates to methods of recording data on optical storage media, and n particular to methods of writing on data cards with prerecorded tracks.

BACKGROUND ART

In U.S. Pat. No. 4,142,209, Hedlund et al. teach a system which records and reads information on a video disk. Television signals are processed on a real time basis and include address codes within the vertical blanking interval in suitable digital format to identify the location of each field of each video picture frame encoded on the disc for subsequent retrieval purposes. Four identical track address codes are provided in the composite video signal that is to be recorded. The system is also applicable to other forms of encoded data such as audio, audio plus video, x-ray, multiplexed frequency modulation (MFM) and pulse code modulation (PCM) signals and digital data. The recording apparatus may be operated in several modes, including a piecemeal mode for recording on a disc that has already been partly recorded. The piecemeal mode is used when the registration between the transducer and the last recorded track on the disc has been disturbed and cannot be readily reestablished, such as when the disc has been removed from its drive. Other aspects of this system are described by Dietrich in U.S. Pat. Nos. 4,308,557 and 4,488,278.

In U.S. Pat. No. 4,544,835, Drexler describes a data card having a strip of reflective direct-read- after-write laser recording material adhered thereto. The strip is laser recordable to produce 25 micron or smaller spots representing data bits which contrast with the surrounding field of the strip. The strip may have a preinscribed formatting pattern for positioning, timing, programming and related functions.

Each of the various industries, that is, financial, medical, insurance, personal and publishing, has formats specific to its particular needs. Further, each industry or user has an optical data card writing and reading machine, called a "card writer/reader", which may be unique to its own needs. For example, each card writer/reader may use its own particular data encoding scheme requiring track indicia for each prerecorded track on the card containing such information as track numbers, synchronization codes, error correction codes, data location indices and the like. Presently, data cards are custom formatted with track indicia for a particular application and for a particular card writer/reader. A card with pre-formatted track indicia for one machine may not work in machines made by other manufacturers or used in other industries.

It would be desirable to produce a generic type card which is usable in a variety of writer/reader devices or in the same writer/reader used in a variety of industries. Such a card has greater usability and efficiency and could be manufactured in much greater quantity, with greater reliability and lower cost than custom formatted cards and would in some ways be analogous to unformatted magnetic discs. One problem with such an approach is that unlike with magnetic disks the reading and writing optics of card writer/readers imposes a limit on the physical extent of the useful data area of a card and this useful area varies with each machine. Also, unlike unformatted magnetic disks, precision prerecorded tracks on the card are necessary for inexpensive precision tracking with an optical servo.

Accordingly, it is an object of the present invention to provide a method for laser recording on data cards pre-formatted with headerless prerecorded servo track guides which still enables the same card to be used in a variety of write/read machines and for a variety of industries.

DISCLOSURE OF THE INVENTION

The above object has been met with a method of optical data recording in which track indicia codes are laser recorded by a user on at least one end of a card that contains prerecorded servo track guides without prerecorded track indicia. Track indicia codes are information which can be laser recorded within a usable area of the data card for a particular data write/read machine exclusive of areas assigned for storing data. This information may include synchronization codes, error correction codes, "do-not-use" codes, track numbers and other information indicating the locations, number of data sectors and identification of the data on the track or on a sector of the card. Also, there may be stop and start marks delimiting the usable area of the card, and in some applications, track termination codes may be written in the usable area adjacent to the start and stop marks.

A data card comprising a laser recordable optical storage medium disposed on a card base is created and prerecorded either photolithographically, by injection molding or by other means with a plurality of parallel servo track guides. To record "do-not-use" information each track is preferably scanned for defects. Any tracks containing defects beyond an acceptable level are marked with a do-not-use code. The manufacturer or user of the card thus may initialize a card, much like magnetic disks are formatted, by writing a pattern of lines, called start and stop marks, near one or both ends of the tracks across the narrow dimension of the card. The position of these marks is determined by the limits of the usable area of a card for a particular card writer/reader. The pattern may be a code indicating, for example, where data are to be read or written. All applicable track indicia may be written during card initialization or may be written one track at a time as the card is used.

An advantage of the present invention is that a manufacturer can make a single generic card design which may be manufactured in volume and used by different card writer/readers and different industries. Each user could format his card with track indicia and software specific to his own needs. Such cards may be used in card writer/reader machines without prior knowledge whether writing and reading proceeds from left to right or right to left on the card or whether tracks are to be numbered from top to bottom or bottom to top on the card. Also, it need not be known at the time of card manufacture what code will be written on the card, what specific write or read beam size will be used or at what speed the media will be scanned. Further, the orientation of the card end for end in the card writer/reader need not be predetermined at the time of card manufacture. And, since track numbers have not been prerecorded, track numbers can be written as data are written, thereby permitting the card to be used in conjunction with a variety of machines which are dedicated to the various industries.

When a block of data is written it may be read to verify that the error rate is at an acceptable level. If recording errors are found to be at an unacceptable level, the track is marked with a do-not-use code. The data are then rewritten on another track which may use the same track number. Thus, if desired sequential track numbers will represent only those verified as acceptable data tracks. Also, data tracks can be divided into sectors which may be treated in a manner similar to tracks. Sectors with unacceptable levels of data recording errors would be marked with do-not-use codes and the data repeated in the next sector.

BRIEF DESCRIPTION OF THE DRAWINGS

FIG. 1 is a top plan of a data card with prerecorded tracks.

FIG. 2 is a top plan of the card of FIG. 1 with initialized start and stop marks.

FIG. 2A is an enlarged view of a portion of the card in FIG. 2.

FIGS. 3A, 3B and 3C are schematic views of data tracks at various stages of recording.

FIG. 4 is a flow chart illustrating a method of recording data on the card of FIG. 1.

FIG. 5 is a flow chart detailing steps for advancing to the first unrecorded track and setting the track number in the method of FIG. 4.

FIG. 6 is a flow chart illustrating a method of recording data on the card of FIG. 1 and checking for defects in that card.

FIG. 7 is a simplified side view of a system for reading and recording on the data card in FIG. 1.

BEST MODE OF CARRYING OUT THE INVENTION

With reference to FIG. 1, a data card 11 comprises a card base 13 and a strip 15 of laser recordable optical data storage material disposed thereon. A plurality of generally parallel tracks 17 are prerecorded on strip 15. Data card 11 is preferably a wallet size card with a width dimension of approximately 54 mm and a length dimension of approximately 85 mm. These dimensions are not critical, but preferred because such a size easily fits into a wallet and has been adopted as a conventional size for automatic teller machines and the like. Card base 13 is a dielectric, usually a plastic material, such as polycarbonate, polyvinylchloride or similar material. Card base 13 may be either opaque or transparent but should have low specular reflectivity, preferably less than 10%, when used with strips 15 which are reflective media. Card base 13 must be transparent when used with strips 15 which are transmissively read. Strip 15 is typically about 10 mm to 35 mm wide and extends the length of the card. Alternatively, strip 15 may have other sizes and orientations. The strip may be applied by any convenient method which achieves flatness and adherence to the card base. A transparent protective laminating sheet made of polycarbonate plastic or other material may cover strip 15 to protect it from dust and scratches.

The laser recordable optical data storage material which forms strip 15 may be one of the reflective recording materials which have been developed having direct-read-after-write capability. Typical recording media are described in U.S. Pat. Nos. 4,314,260, 4,278,758, 4,278,756, 4,298,684, 42269,917, and 4,284,716, all assigned to the assignee of the present invention. These media contain suspensions of reflective metal particles in organic colloids and form highly reflective low melting temperature laser recordable media. Data is recorded by forming reduced reflectivity spots which contrast with the surrounding field of the reflective layer itself. Reflectivity of the strip field of about 50% with a reflectivity of a spot in the field of less than 10% is preferred, thus creating a contrast ratio of at least five to one, although a contrast ratio of two to one or even lower may be sufficient for reading the data. Alternatively, media which have reflective spots in a low reflectivity field and media which are read by light transmission through the card may also be used. Erasable, direct-read-afte-write materials, such as magneto-optic and amorphous-to-crystalline recording materials, may also be used.

With reference to FIG. 2, data card 11 is seen to have been initialized, i.e. marked with start and stop marks 19 and 21, so as to demarcate the ends of the usable recording area 23. Once initialized, a card writer/reader will not write data too close to a "stop" point for a given machine. The stop point is determined by the reading and writing optics of a card writer/reader and may vary for each machine type. Beyond the stop point, in areas 25 and 27, data writing is either impossible or subject to an unacceptably high level of read errors. In the event that the stop point for a particular card writer/reader is sufficiently large to be beyond an edge of the card, card initialization demarcates the effective edge of the card. The effective edge of the card need not be identical to the physical edge of the card. The smaller the distance between the data areas and the physical card edge, the more accurate must be the cutting of the card during production. Accurate cutting implies relatively sophisticated and expensive equipment in addition to a greater number of rejected cards. Accordingly, depending on the tolerances indicated for particular type of card, the effective card edge may be set a certain distance away from the physical card edge.

Start and stop marks 19 and 21 are laser recorded as a series of lines across the narrow dimension of the cards. The marks can be continuous as shown or consist of dashed lines across each track. Prerecorded track lines 17 generally extend the length of card 11. Initialization may be performed on dedicated apparatus or on a data card writer/reader, such as the apparatus in FIG. 7, with appropriate software. Each start and stop mark 19 and 21 may comprise one or a pair of parallel lines, as shown, or a series of lines in a predetermined pattern, as in FIG. 3B. The pattern forms a code which when read indicates the location of data areas, i.e. where data ar to be written or read. Alternatively, the pattern may indicate other information, such as the number of data sectors on a track or the particular data encoding scheme being used.

The position of the start and sto marks 19 and 21 corresponds to the stop points for a particular card writer/reader, with the edgemost lines in marks 19 and 21 preferably coinciding with the stop points. The marks thus define a user recordable area 23 therebetween and nonusable areas 25 and 27 between the star and stop marks 19 and 21 and their nearest card edge 26 and 28 respectively. On cards which are intended to be inserted in only one particular direction into a card writer/reader, a stop mark 21 need not be recorded during initialization. Then the start mark 19 defines a user recordable area 23 between the mark 19 and the furthest edge 28. Appropriate track indicia may also be written during initialization or when the card is being recorded upon by the user.

FIG. 2A shows an enlarged portion of data card 11. Tracks 17 may be prerecorded either photolithographically, by molding, or other means. One type of photolithographic prerecording involves exposing photsensitive material which is to form strip 15 to actinic radiation through an imagewise pattern on a mask. The material is subsequently processed to form the strip 15 of laser recordable optical data storage material. One such photolithographic recording process is described in U.S. Pat. Nos. 4,304,848 and 4,278,756, assigned to the assignee of the present invention. As mentioned above, start and stop marks 19 and 21 are laser recorded across the narrow width of the card. As seen in FIG. 2A, start mark 19 forms a series of lines recorded crosswise over the prerecorded tracks.

The user recordable area 23 defined by marks 19 contains laser recorded spots 29. Spots 29 represent data bits as well as track indicia, including but not limited to synchronization marks, error codes and track numbers. Spots 29 are generally greater than about 2 microns in size, preferably about 3 to 5 microns, but may be any size in the range from about 1 micron to 35 microns. Spots 29 may be either round or oblong and are typically recorded in paths between tracks 17 with a separation dependent upon spot size and code scheme. Tracks 17 are also separated from each other by about 10 to 20 microns. Depending on the particular encoding scheme, bits may also be represented by the absence of spots, changes in spot size, shape or length and changes in spot reflectivity or transmissivity.

Returning to FIG. 2, after data card 11 is created it may be disposed in recording relationship with a laser recording apparatus, as shown in FIG. 7. Track indicia and data 41 are written in at least one track in user recordable area 23 of strip 15. At a later time, card 11 may be disposed in recording relationship with a second laser recording apparatus, which may or may not be the same as the first apparatus. Track indicia and data 42 are written on at least one unrecorded track in user recordable area 23. Track indicia and data 41 and 42 may be recorded in different encoding schemes by the first and second card writer/readers, although this is not essential. Writing of track indicia and data 41 and 42 need not proceed in the same direction. For example, the first card writer/reader may write data 41 in a first direction, such as direction 30 proceeding from end 26 to end 28. The second card writer/reader may write data 42 in a second direction, such as opposite direction 32 proceeding from end 28 to end 26. Alternatively, the card writer/readers may write data in the same direction but with card 11 oriented in opposite directions relative to the first and second card writer/readers. Relative to the card, the result is the same with data on the card being recorded in opposite direction. Further, when writing track indicia and data, tracks, defined between track guides 17, may be numbered by one card writer/reader beginning with tracks nearest a top lateral edge 22 of strip 15 toward tracks nearest a bottom lateral edge 24 of strip 15, while another card writer/reader may number tracks from bottom edge 24 towards top edge 22. Thus, in one or more of these manners, the same card may be used to store information from different industries or different machines. For example, data 41 may be medical records of a person, while data 42 on the same card may be medical insurance information of that person.

With reference to FIGS. 3A-3C, a generic data card 11 containing prerecorded tracks 17 only is marked with start and stop marks 19 and 21 respectively. Marks 19 and 21 define a user recordable area 23 therebetween for recording track indicia codes 40 and data 41. Data 41 are recorded in one or more data areas, such as the area between dashed lines 24 and 26 in FIG. 3C. Track indicia codes 40 include all marks which are laser recorded in the user recordable area 23 exclusive of data areas.

In FIG. 3C, track indicia codes 40 include synchronization marks 31, track numbers 33 and 43, error codes 35, 37, 45 and 47 and sector numbers 39 and 49. Track numbers 33 are designated in FIG. 3c by reference numerals 33a, 33b, 33c, 33d, and 33e, each representing a particular track number recorded on a track. As already noted above, start and stop marks 19 and 21 may be a series of lines recorded across the tracks 17 in a pattern representing a code. The code may indicate the location and number of data areas, the encoding scheme being used, and the like. Start and stop marks may alternatively be laser recorded spots which are written as the card is used. Start mark 19 is typically followed by synchronization marks 31. Synchronization marks typically comprise a plurality of equally spaced laser recorded spots, and serve to establish the location and spacing of laser recorded spots on the remainder of the track. Although six spots per track are shown in FIG. 3C, the actual number may vary depending on the difficulty in achieving synchronization for a particular card writer/reader. Synchronization marks 31 with from four to sixteen marks are typical.

Track numbers 33 and 43 are recorded as data are written. Tracks without laser recorded track numbers have no data. A track number is used which is one higher than for the previous track. The previous track number may be obtained from reading the track number stored in a certain place on the card, such as immediately following synchronization codes 31, or from reading the entire last written track. The number of bits used to specify a track number depends on the total number of tracks on a card. For example, a card with up to 128 tracks requires seven bit track numbers. As or after track of data is written, it is read to verify that it has been correctly recorded. An error or "do-not-use" code 35, 37, 45 or 47 is then written ahead of the track number or immediately after to indicate whether or not the data are correct.

In FIG. 3C, three spot locations are dedicated to each "do-not-use" or error code. Each bit may be used to indicate a different type of error. For example, the first bit might be used to indicate a faulty track. Cards are typically prescanned at the point of manufacture or during initialization of a card. Good tracks are marked with a spot while defective tracks are not marked, or vice versa. Faulty tracks are not written on any further.

The second error bit might be used for data recording errors identified immediately after writing. If a data block is recorded with an unacceptable error level it is rewritten and the cycle repeated as many times as permitted by the particular software. A data block is satisfactorily recorded with an acceptable error level when the detected level of recording errors is below a redetermined limit or percentage. In such cases, the same track number is used until a satisfactory data write is identified. Thus, regardless of the number of attempted track writings, sequential track numbers will represent only those verified as good tracks with correctly recorded data. In FIG. 3C, the laser recorded spots between track lines 17a and 17b are assigned a track number 33a with a value of one and the error code 35 indicates that the data are correct. The next track, between track lines 17b and 17c, is assigned the next higher track number 33b with a value of two. Error code 37, however, indicates an unsatisfactory level of recording error. Accordingly, the same data block is recorded again on the next track, between track lines 17c and 17d. This track is assigned a track number 33c with the same value as track number 33b. The data in this track are recorded satisfactorily so the following track is assigned the next higher track number 33d with a value of three.

The third error bit can be reserved for the user's particular application. For example, it may function as a parity bit for checking the accuracy of future data reads. Additional error bits may also be used.

Data tracks can be and usually are divided into sectors. The number of sectors may vary depending on the application. Typically, there are between two and eight sectors per track. Track numbers 43 which correspond to track numbers 33a–33d and error codes 45 and 47 are written after each sector. Sector numbers 39 and 49 identify each sector. Sectors permit shorter data blocks to be recorded, thereby decreasing the likelihood that a block will have an error and need to be rewritten. Sectors may also be provided for other design considerations, such as providing different sectors for various types of data. Further, when an error is detected, the data are written into the next sector instead of on a new track and an error code would be written indicating that the first sector is bad.

With reference to FIG. 4, a method for writing data on a data card using a card writer/reader begins by advancing a data reading and writing element of the card writer/reader into proper relationship with the first unrecorded track on the card, and setting a register of the card writer/reader to a track number. This first step may be performed as shown in FIG. 5.

A data card is positioned in a card writer/reader and the data reading and writing element of the card writer/reader is advanced into reading and writing relationship with the first, i.e. edgemost track. The track number register of the card writer/reader is set to one. The track is scanned and the error code is read. If an error is indicated by the error code, the writing and reading element is advanced one track location to the next track. If no error is indicated, scanning continues in an attempt to find a recorded track number. If a track number is found, indicating a track which already has recorded data, the track number is registered and the reading and writing element is advanced one track location. This process continues until a track is found which has no indicated error and no recorded track number. This track is an unrecorded track available for writing data and the last registered track number is incremented by one. Other methods for finding an unrecorded track may be used.

Returning to FIG. 4, after having located the first unrecorded track, the error code is read, and if a satisfactory track is indicated, the track is again scanned for defects. If an unacceptable level of defects is found, an error code is marked on the track indicating that fact. In either the case in which errors are indicated, i.e. by an error code or by a defect found during scanning, the card writer/reader advances to the next adjacent track location. If the track is satisfactory, the track number stored in the track number register of the card writer/reader is written in the current track on the card, and a data block is written in a data area on the track.

During or immediately following data recording, data and indicia actually recorded on the data card are checked against the original data base for recording errors. If unacceptable recording errors are found, the track is marked with an error code indicating the recording error, and the data block is saved in a temporary storage location so that it may be rewritten in another track location. If the recording is satisfactory, the card writer/reader checks to see if there is more data, and if so the data are written an additional track locations. Data recording continues until no more data remains to be recorded.

Data blocks may occupy an entire data area of a track. Alternatively, data may be recorded in sectors with several data blocks being recorded on a single track. Accordingly, if more data remain to be recorded on the card, the card writer/reader checks whether the end of the track has been reached. This will always be the case where large data blocks occupying an entire track are recorded, but will not necessarily be the case where data are recorded in sectors. If the end of the track has not been reached, the track number and other indicia are written followed by the next data block. If the end of the track has been reached, the track number is incremented, tthe reading and writing element of the card writer/reader is advanced one track location so as to be in reading and writing relationship with the next track, and the error code checking procedure is repeated, as noted above for the previous track, with the new track.

When an unacceptable level of recording error has been detected, the data block which is saved may be recorded either on a new track or in a new sector depending on the particular data writing software that is used. Typically, the data block is rewritten on a new track when large data blocks occupying entire tracks are recorded and the databblock is rewritten in a new sector when data blocks are recorded in sectors. However, data blocks may also be rewritten on a new track where data blocks are recorded in sectors. In any case, if recording is to be done on an new track, the reading and writing element is advanced one track location without incrementing the track number Thus, track numbers indicate in this case, only those tracks verified as having good data. If data are rewritten in sectors, the card writer/reader checks whether the end of the track has been reached, if not, then writing the track number and other indicia and rewriting the data block. If the end of the track has been reached, the track number is incremented, the track location advanced to an adjacent track, and the data block including indicia rewritten in a sector on the new track.

With reference to FIG. 6, when a card is manufactured, factured all tracks are scanned for defects. First, a card is created with prerecorded tracks, as described above with reference to FIG. 1. The card may be checked in either a dedicated machine or a card writer/reader. Advancing into reading and writing relationship with the first track, i.e. an edgemost track, the track is scanned. If unacceptable defects are found, the track is marked with an error code indicating that defect. Advancing to the next track, the scanning is repeated until there are no more tracks remaining to be scanned. The number of defective tracks may be counted, if desired, and the card rejected if the number of defective tracks exceeds a preset amount.

With reference to FIG. 7, a side view of the lengthwise dimension of a data card 51 is shown. The card is usually received in a movable holder 53 of the card writer/reader in a position which brings the card into the beam trajectory. The card writer/reader includes a laser light source 55, preferably a pulsed semiconductor laser of near infrared wavelength. Laser 55 emits a beam 57 which passes through collimating and focusing optics 59. The beam is sampled by a beam splitter 61 which transmits a portion of the beam to a photodetector 63. The detector 63 confirms laser writing and is not essential. The beam is then directed to a first servo controlled mirror 65 which is mounted for rotation along the axis 67 in the direction indicated by the arrows A. The purpose of the mirror 65 is to find the lateral edges of the laser recording material in a coarse mode of operation and then in a fine mode of operation identify data paths which exist predetermined distances from the edges.

From mirror 65, the beam is directed toward mirror 69. This mirror is mounted for rotation at pivot 71. From mirror 69, the beam is directed toward card 51 in a lengthwise scanning motion. Light is focused into the card by focusing lens 77. The purpose of mirror 65 is for fine control of motion of the beam along the length of the card. Coarse control of the lengthwise position of the card relative to the beam is achieved by motion of movable holder 53, as indicated by arrows C. The position of the holder may be established by a linear motor adjusted by a closed loop position servo system of the type used in magnetic disk drives. During its manufacture the card is prerecorded with a preinscribed pattern containing servo tracks. These positioning marks can be used as a reference for the laser recording along data track. Position error signals may be generated and used as feedback in motor control.

Upon reading one data path, the mirror 65 is slightly rotated. The motor moves holder 53 lengthwise so that the path can be read, and so on. Light scattered and reflected from the spots contrasts with the surrounding field where no spots exist. The writing beam should deliver sufficient laser pulse energy to the surface of the recording material to create spots. Typically, 5-20 milliwatts of laser power is required, depending on the recording material. A 20 milliwatt semiconductor laser, focused to a five micron-beam size, records at temperatures of about 200 C. and is capable of creating spots in less than 25 microseconds. The wavelength of the laser should be compatible with the recording material. In the rear mode, power is lowered to about 5% of the record power. Alternatively, a second light source 79, preferably a light emitting diode, may be used to generate a reading beam 80. Beam 80 passes through collimating and focusing optics 81 and is deflected onto the main beam path by beam splitter 83.

Optical contrast between a spot and surrounding field are detected by light detector 75 which may be a photodiode. Light is focused onto detector 75 by beam splitter 73 an focusing lens 74. Servo motors, not shown, control the positions of the mirrors and drive the mirrors in accord with instructions received from control circuits, as well as from feedback devices. The detector 75 produces electrical signals corresponding to spots. These signals are processed and recorded for error checking and reading data.

The methods described herein are useful for recording and reading data on a generic card, i.e. a card which is prerecorded with tracks only and subsequently laser recorded with data including track indicia. The card may then be used by different industries which have formatting specific to their own needs. Track indicia codes allow the user to specify his specific formatting such as machine dependent user recordable areas, data areas, laser recorded spot spacing, encoding schemes and the like. The methods also permit substantially simpler track numbering and searching by writing track numbers at the same time data are recorded, and by using the same track number when rewriting an incorrectly recorded data block.

What is claimed is:

1. A method of storing data on a card comprising,
   (a) creating a data storage card having a laser recordable optical storage medium thereon, said medium having opposed ends and a plurality of prerecorded track guides defining tracks therebetween, said tracks being free of any prerecorded track indicia and then being prerecorded by a first recording device at a first location,
   (b) disposing said card in recording relationship with a laser recording apparatus, said laser recording apparatus being a second recording device located at a second location,
   (c) marking a first stop point with said laser recording apparatus on said tracks near a first end of said medium, said stop point defining a user available recording area of said track between said stop point and a second end of said card,
   (d) writing a first set of track indicia on a track in said user available recording area with said laser recording apparatus,
   (e) writing at least one track identification code corresponding to said track with said laser recording apparatus on said track in said user available recording area,
   (f) writing data on said track in said user available recording area with said laser recording apparatus, and
   (g) repeating steps (d) through (f) on an unrecorded track while any data remain to be recorded.

2. The method of claim 1 further comprising,
   marking a second stop point after step (c) with said laser recording apparatus on said tracks near said second end of said medium farthest from said first stop point, said user available recording area being redefined between said first and second stop points,
   writing a second set of track indicia after step (f) and prior to step (g) on said track in said user available recording area, and
   including the step of writing a second set of track indicia in step (g).

3. The method of claim 1 wherein said stop points comprises at least one transverse line across said medium.

4. The method of claim 3 wherein said stop points comprise a plurality of transverse lines in a pattern representing formatting information.

5. A method of storing data on a card comprising,
   (a) creating a data storage card having a laser recordable optical storage medium thereon, said medium having opposed ends and a plurality of prerecorded track guides defining tracks therebetween, said tracks being free of any prerecorded track indicia and then being prerecorded with a first recording device located at a first location, (b) disposing said card in recording relationship with a laser recording apparatus, said laser recording apparatus being a second recording device located at a second location, (c) marking start and stop marks with said laser recording apparatus across said tracks near opposed ends of said medium, said start marks being near one end and said stop marks being near the opposite end of the medium, said start and stop marks defining a user available recording area therebetween, (d) writing track indicia with said laser recording apparatus on said track in said user available recording area, (e) writing data indicia with said laser recording apparatus on said track in said user available recording area, and (f) repeating step (d) and (e) on an unrecorded track while any data remain to be recorded.

6. The method of claim 5 wherein each of said start and stop marks comprise at least one transverse line across said medium.

7. The method of claim 6 wherein said start and stop marks each comprise a plurality of transverse lines in a pattern representing formatting information.

8. A method of storing data on a card comprising, (a) creating a data storage card having a laser recordable optical storage medium thereon, said medium having opposed first and second ends and top and bottom lateral edges, said medium having applurality of prerecorded track guides between said ends, said track guides defining tracks therebetween, (b) disposing said card in recording relationship with a first laser recording apparatus, employing a first recording format, (c) writing track indicia and data in a first direction on a first track in a user recordable area of said medium with said first laser recording apparatus, (d) disposing said card in recording relationship with a second laser recording apparatus, said second laser recording apparatus having a different encoding format from said first recording format, and (e) writing track indicia and data in a second direction on a second track in said user recordable area with said second laser recording apparatus.

9. The method of claim 8 wherein writing in step (c) in said first direction proceeds on said first track from said first end of said medium to said second end of said medium, and writing in step (e) in said second direction proceeds on said second track from said second end to said first end.

10. The method of claim 8 wherein writing track indicia in step (c) includes numbering said first track from tracks nearest said top lateral edge of said medium toward tracks nearest said bottom lateral edge of said medium, and writing track indicia in step (e) includes numbering said second track from tracks nearest said bottom lateral edge towards said top lateral edge.

11. The method of claim 8 wherein said card is oriented in step (b) in a first direction relative to said first laser recording apparatus, and said card is oriented in step (d) in an opposite direction relative to said second laser recording apparatus.

* * * * *

UNITED STATES PATENT AND TRADEMARK OFFICE
CERTIFICATE OF CORRECTION

PATENT NO. : 4,910,725

DATED : March 20, 1990

INVENTOR(S) : Jerome Drexler et al.

It is certified that error appears in the above-identified patent and that said Letters Patent is hereby corrected as shown below:

Column 1, line 8, "n" should read - - in - -.

Column 3, line 68, "42269,917" should read - - 4,269,917 - -.

Column 4, line 52, "where data ar" should read - - where data are - -.

Column 4, line 57, "start and sto marks" should read - - start and stop marks - -.

Column 4, line 62, "between the star" should read - - between the start - -.

Column 6, lines 65-66 "below a redetermined limit" should read - - below a predetermined limit - -.

Column 8, line 14, "an additional track" should read - - in additional track - -.

Column 8, line 29, "is incremented,tthe reading" should read - - is incremented, the reading - -.

Column 8, line 37, "recorded" should read - - rerecorded - -.

Column 8, line 41, "databblock" should read - - data block - -.

Column 8, line 45, "if recording is be done on an new track," should read - - if rerecording is to be done on a new track, - - .

Column 8, lines 57-58, "is manufactured, factured all tracks" should read - - is manufactured, all tracks - -.

UNITED STATES PATENT AND TRADEMARK OFFICE
CERTIFICATE OF CORRECTION

PATENT NO. : 4,910,725

DATED : March 20, 1990

INVENTOR(S) : Jerome Drexler et al.

It is certified that error appears in the above-identified patent and that said Letters Patent is hereby corrected as shown below:

Column 9, lines 35-36, "along data track." should read
-- along data tracks. --.

Column 9, lines 59-60, "beam splitter 73 an focusing lens 74."
should read -- beam splitter 73 and focusing lens 74. --

Claim 3, column 10, lines 55-56, "stop points comprises"
should read -- stop points comprise --.

Claim 8, column 11, lines 30-31, "having applurality" should read
-- having a plurality --.

Signed and Sealed this

Twenty-first Day of January, 1992

Attest:

HARRY F. MANBECK, JR.

*Attesting Officer*          *Commissioner of Patents and Trademarks*